US006940838B1

(12) United States Patent
Stead (10) Patent No.: US 6,940,838 B1
(45) Date of Patent: Sep. 6, 2005

(54) WIRELESS TELEPHONE NETWORK OPTIMIZATION

(75) Inventor: Graham D. Stead, Arlington, VA (US)

(73) Assignee: Invertix Corporation, Annandale, VA (US)

( * ) Notice: Subject to any disclaimer, the term of this patent is extended or adjusted under 35 U.S.C. 154(b) by 657 days.

(21) Appl. No.: 09/642,201

(22) Filed: Aug. 21, 2000

Related U.S. Application Data (60) Provisional application No. 60/149,888, filed on Aug. 19, 1999.

(51) Int. Cl.[7] .............................................. H04B 7/216
(52) U.S. Cl. ...................... 370/335; 370/342; 370/350; 455/561
(58) Field of Search .............................. 370/252, 335, 370/337, 342, 350, 310; 455/449, 561, 434

(56) References Cited

U.S. PATENT DOCUMENTS

| | | | |
|---|---|---|---|
| 5,023,900 A | 6/1991 | Tayloe et al. .................. 379/32 |
| 5,095,500 A | 3/1992 | Tayloe et al. .................. 379/32 |
| 5,285,494 A | 2/1994 | Sprecher et al. ............... 379/59 |
| 5,293,640 A | 3/1994 | Gunmar et al. .............. 455/33.1 |
| 5,369,786 A | 11/1994 | Hulsebosch .................. 455/70 |
| 5,442,804 A | 8/1995 | Gunmar et al. ............. 455/33.1 |
| 5,491,644 A | 2/1996 | Pickering et al. ........... 364/514 |
| 5,553,094 A | 9/1996 | Johnson et al. ............. 375/200 |
| 5,561,841 A | 10/1996 | Markus ....................... 455/33.1 |
| 5,598,532 A | 1/1997 | Liron ...................... 395/200.01 |
| 5,640,676 A | 6/1997 | Garncarz et al. .......... 455/33.2 |
| 5,640,677 A | 6/1997 | Karlsson ..................... 455/33.2 |
| 5,668,562 A | 9/1997 | Cutrer et al. ................ 343/703 |
| 5,710,758 A | 1/1998 | Soliman et al. ............. 370/241 |
| 5,713,075 A | 1/1998 | Threadgill et al. .......... 455/427 |
| 5,758,264 A | 5/1998 | Bonta et al. ................ 455/67.7 |
| 5,764,687 A | 6/1998 | Easton ....................... 375/206 |
| 5,794,128 A | 8/1998 | Brockel et al. ............. 455/67.1 |
| 5,799,154 A | 8/1998 | Kuriyan .................. 395/200.53 |
| 5,854,981 A | 12/1998 | Wallstedt et al. ........... 455/439 |
| 5,859,838 A | 1/1999 | Soliman ..................... 370/249 |
| 5,878,328 A | 3/1999 | Chawla et al. ............. 455/67.1 |
| 5,887,156 A | 3/1999 | Subramanian et al. ...... 395/500 |
| 5,890,076 A | 3/1999 | Takano et al. .............. 455/561 |
| 5,915,221 A | 6/1999 | Sawyer et al. .............. 455/437 |
| 5,946,621 A | 8/1999 | Chheda et al. .............. 455/440 |
| 5,949,988 A | 9/1999 | Feisullin et al. ........ 395/500.23 |
| 5,953,669 A | 9/1999 | Stratis et al. ................ 455/449 |
| 6,041,236 A | 3/2000 | Bernardin et al. .......... 455/446 |
| 6,047,186 A | 4/2000 | Yu et al. ...................... 455/446 |
| 6,161,022 A * | 12/2000 | Hwang et al. .............. 455/561 |

(Continued)

FOREIGN PATENT DOCUMENTS

| | | |
|---|---|---|
| DE | 40 30 825 | 4/1991 |
| WO | 97/19522 | 5/1997 |
| WO | 97/29557 | 8/1997 |
| WO | 97/41652 | 11/1997 |
| WO | 99/27718 | 6/1999 |

*Primary Examiner*—Frank Duong
*Assistant Examiner*—Melanie Jagannathan
(74) *Attorney, Agent, or Firm*—Roberts, Abokhair & Mardula, LLC (57) ABSTRACT

A wireless network can be easily optimized utilizing processes according to the present invention. A simulation environment allows a network engineer to vary parameters (e.g., antenna height, tilt, and power) of a virtual model of the wireless network and observe how the changes affect coverage. Algorithms also enable hand off timing parameters for sectors in a wireless network to be optimized. One algorithm analyzes measured data regarding network coverage and regional terrain to arrive at a report containing recommended values for window size parameters (code division systems) or timing advance parameters (time division systems). Another algorithm analyzes measured data regarding network coverage to arrive at a report, containing recommended neighbor lists for each sector in the network.

3 Claims, 8 Drawing Sheets

U.S. PATENT DOCUMENTS 6,173,185 B1     1/2001  Bernardin et al. .......... 455/446
6,320,849 B1 * 11/2001  Hughes et al. .............. 370/310
6,363,261 B1 *  3/2002  Raghavan ................... 455/561
6,577,616 B1 *  6/2003  Chaudry et al. ............ 370/342
6,633,559 B1 * 10/2003  Asokan et al. .............. 370/350
6,804,212 B1 * 10/2004  Vallstrom et al. .......... 370/331

* cited by examiner

| | Sector Name | Weight | Number of Points | Chip Offset | SRCH_WIN_N |
|---|---|---|---|---|---|
| 1 | 161-1 (pn 282) | 65.17 | 174 | 5.8 | 4 |
| 2 | 279-1 (pn 273) | 1.521 | 7 | 9.3 | 5 |
| 3 | 279-2 (pn 279) | 0.666 | 2 | 8.8 | 5 |
| 4 | 281-2 (pn 144) | 6.102 | 32 | 5.8 | 4 |
| 5 | 281-3 (pn 141) | 6.272 | 23 | 0.9 | 0 |
| 6 | 413-1 (pn 210) | 1.430 | 7 | 12.2 | 6 |
| 7 | 452-2 (pn 153) | 8.626 | 40 | 11.7 | 6 |
| 8 | 452-3 (pn 150) | 37.16 | 132 | 11.7 | 6 |
| 9 | 478-1 (pn 93) | 0.495 | 3 | 19.1 | 7 |
| 10 | 479-3 (pn 312) | 0.353 | 2 | 26.6 | 8 |

WIRELESS TELEPHONE NETWORK OPTIMIZATION

REFERENCE TO OTHER APPLICATION

This application claims priority under 35 U.S.C. § 119(e) from provisional application No. 60/149,888 filed Aug. 19, 1999 by Graham D. Stead, entitled "Wireless Telephone Network Optimization". The 60/149,888 application is incorporated by reference herein in its entirety for all purposes.

BACKGROUND OF THE INVENTION

1. Field of the Invention

The present invention is directed to the art of wireless telephone networks. More particularly, the present invention is directed to optimizing parameters of radio base stations in a wireless telephone network.

2. Background Information

Cellular and PCS telephone services have enjoyed explosive growth over the last ten years. There is no reason to believe that this growth will not continue for some time. This continued growth creates a great demand for the infrastructure that supports these services. As more and more people begin to use wireless telephones, more and more fixed location base stations must be installed across the landscape to handle the rising demand for wireless traffic.

Each wireless telephone base station has a plurality of transceivers, each connected to a respective antenna. The electromagnetic radiation pattern of each of these antennas defines the coverage area of a "sector." Each sector in the wireless network has some degree of overlap with one or more nearby sectors, and in the aggregate, the coverage areas of all the sectors in the network define coverage area of the network as a whole.

One difficulty in establishing a network of base stations is that the aggregate coverage provided by the sectors is not perfect. It may have weak spots, or self-interference spots, where wireless telephony functions at a substandard level or it may even have dead spots where no wireless calls can function at all. Such problems can be rectified by optimizing the sectors to attempt to cover the weak and/or dead spots in wireless coverage. Coverage optimization may be accomplished by varying a number of parameters for each sector. One parameter to vary is the azimuth angle at which the antenna for the sector is pointed. Other parameters to vary are the antenna height (moving the antenna higher or lower on its tower, host building, or other supporting structure), the angle of tilt of the antenna (useful in uneven terrain locations), and the amount of power radiated by the antenna. Additionally, the option is also available to substitute a different type of antenna (different model or different manufacturer entirely) in order to obtain better coverage results.

This optimization process is laborious and time consuming. Each time a network engineer wants to change four of the five above-identified parameters of a sector (azimuth, height, tilt, antenna type), someone has to climb up a tower (or other support structure) and physically make an adjustment to the antenna. Only power changes can be made without a need to get at the antenna. Once a parameter has been varied, a fresh set of signal strength measurements must be made by physically driving around the relevant terrain with a measurement device to map out how the parameter change has affected coverage. After analyzing the measurements, another parameter (perhaps for a different sector) can then be varied. This iterative process of vary-measure-vary-measure is repeated over and over again until an optimum result is obtained. It takes a long time and relies upon highly skilled workers to accomplish.

Thus, what is needed is a labor-saving and time-efficient way to develop optimum coverage-related parameters for sectors of a wireless network.

A wireless telephone often communicates via a number of sectors in succession in the course of a single telephone call via a process called hand-off. In simple terms, one sector will transfer to a neighboring sector the responsibility for handling the wireless telephone call. A hand off may be necessitated because the wireless telephone unit is portable and has moved out of the effective range of the sector that had been heretofore handling the call, or it may be necessitated due to high demand for the limited number of channels that the sector can provide. This is (ideally) done in a seamless manner such that the user of the telephone never notices any discontinuity in service.

In order for call hand offs between sectors to be performed effectively, a number of parameters of the hardware supporting each sector need to be optimized. One parameter is called a "neighbor list." Each sector has a neighbor list, which is a ranked listing of neighboring sectors to which hand offs may most appropriately be made. The ranking of members in a neighbor list is an important factor in enabling effective hand offs. However, prior art practice is for a network engineer to simply make an educated guess as to which neighboring sectors should be included as members of the neighbor list of a given sector, as well as how to rank the members of the list by importance. Prior art practice does not include a rigorous analysis of how members of a neighbor list should be ranked, or even which neighboring sectors should be included as members of the list.

Another parameter relevant to hand off effectiveness in CDMA wireless networks is "window size." Window size is a parameter that is set for each sector uniquely. This parameter tells a mobile wireless telephone unit how wide a "window" of code space (in chips) the mobile unit should search through in order to attempt to synchronize with the PN (pseudo noise) sequence of a given sector. As a general rule, it is desirable to set the window size parameter to be the smallest size that will give an acceptable rate of capture of the PN sequence of the sector.

The prior art provides no satisfactory device or process for optimizing choices of window size for the sectors in a network. As with coverage optimization, a network engineer must program the window size parameter at each sector based on his or her best guess as to what should be an optimum value.

A related concept in time division type wireless networks (e.g., GSM, TDMA, iDEN) is the "timing advance" parameter. Timing advance is an analogous concept to the window size parameter of CDMA networks, but is directed to finding an appropriate time slot rather than to code synchronization. The prior art does not provide a suitable way to optimize timing advance, either, leaving network engineers to guess their way to an optimum solution. Such a haphazard optimization technique is not an efficient use of the time of highly skilled workers.

Thus, what is needed is an effective way to optimize hand off timing parameters for sectors in a wireless network.

SUMMARY OF THE INVENTION

It is an object of the present invention to provide a labor-saving and time-efficient way to develop optimum coverage-related parameters for sectors of a wireless network.

To address the need for a way to develop optimum coverage-related parameters for sectors of a wireless network, the present invention provides a simulation environment. This simulation environment allows a network engineer to vary parameters of a virtual model of the wireless network and observe how the changes affect coverage.

It is another object of the present invention to provide algorithms to optimize hand off timing parameters for sectors in a wireless network.

To address the need for a way to optimize hand off timing parameters for sectors in a wireless network, the present invention provides an optimization algorithm. The optimization algorithm analyzes measured data regarding network coverage and regional terrain to arrive at a report containing recommended values for window size parameters (code division systems) or timing advance parameters (time division systems). The optimization algorithm analyzes measured data regarding network coverage and regional terrain to arrive at a report containing recommended neighbor lists for each sector.

Some of the above objects are obtained by a process of modeling signal strength coverage of a wireless network based on empirical coverage measurements for the network over a region of interest, based on user inputs, and based on terrain data in the region of interest, the network having plural base station antennas. The process includes mapping the empirical coverage measurements onto the terrain data to provide an initial coverage model, and receiving from a user an input for change of a parameter of one of the antennas. The process also includes generating outputs of signal strength at points on the terrain that are affected by the parameter change, and modifying the initial coverage model based on the generated outputs of signal strength to provide a hypothetical coverage model.

Some of the above objects are also obtained by a process of generating a neighbor list for a sector-of-interest in a wireless network based on empirical measurements of signal to noise ratio. The process includes calculating a weight for every pair wise combination of the sector-of-interest other network sectors between which a predetermined threshold signal level criteria, T_ADD, is met. The process also includes ordering the calculated weights from largest to smallest, and listing the sectors that meet the T_ADD criteria with respect to the sector-of-interest in rank order corresponding to the ordered calculated weights.

Some of the above objects are also obtained by a process of selecting a value of window size for a sector-of-interest in a code division multiple access wireless network. The process includes selecting the earliest arriving multipath signal of all sectors that meet the threshold criteria Ec/Io>T_ADD, wherein T_ADD is a predetermined threshold signal level, and selecting a pair of sectors, ToSector and FromSector, that meet the threshold criteria Ec/Io>T_ADD. The process also includes setting a window size of FromSector=chip delay of ToSector—chip delay of the earliest arriving multipath sector, evaluating whether the window size of FromSector>maximum window size, and in the event that the window size of FromSector is greater that the maximum window size, then set maximum FromSector window size=the window size of FromSector.

Some of the above objects are also obtained by a process of generating a value of timing advance for a sector-of-interest in a time division-type wireless network. The process includes selecting a sector, FromSector, with a sufficient Received Signal Strength Indication (RSSI) to serve a call, calculating the distance to FromSector, and setting timing advance of FromSector=one half the distance to FromSector. The process also includes evaluating whether FromSector's timing advance>maximum timing advance, and in the event that FromSector's timing advance is greater than the maximum timing advance, then set maximum FromSector timing advance=FromSector timing advance.

DETAILED DESCRIPTION OF THE INVENTION

Several types of input information are initially gathered together to create a virtual environment for purposes of simulation of a wireless network. Once the baseline representing the status quo is established, a user is able to perform simulations by varying one or more parameters from those that exist in reality. The varied parameters have many affects on performance of the system, and these effects are modeled by the present invention.

Figure 1:
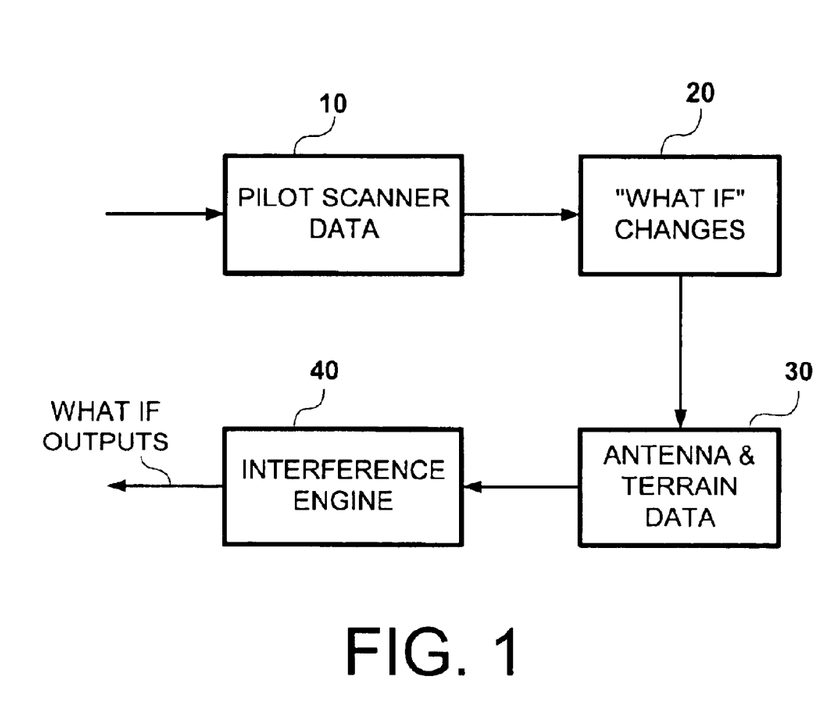
FIG. 1 illustrates a high-level flow chart for performing simulation according to an embodiment of the present invention.

Referring to FIG. 1 a high-level flow chart illustrates how simulation is done according to the present invention. Data gathered by a pilot scanner (gathered over days or even weeks of "drive" tests) is used to provide a comprehensive mapping 10 of signal strengths of the sectors of a wireless network in a given region. A user then proposes "what if" changes 20 to the parameters of the network. The pilot scanner data and the proposed "what if" changes are utilized along with data pertaining to antennas used (or that may be used) in the network and three dimensional cartographic data 30 as inputs to an interference engine 40. The interference engine 40 is an algorithm that takes the above-described inputs and generates "what if" outputs of signal strength at points on the terrain that are affected by the proposed "what if" changes. In addition to measured RF data (from drive tests), antenna data, and terrain data, MSC information may also be input.

Figure 2:
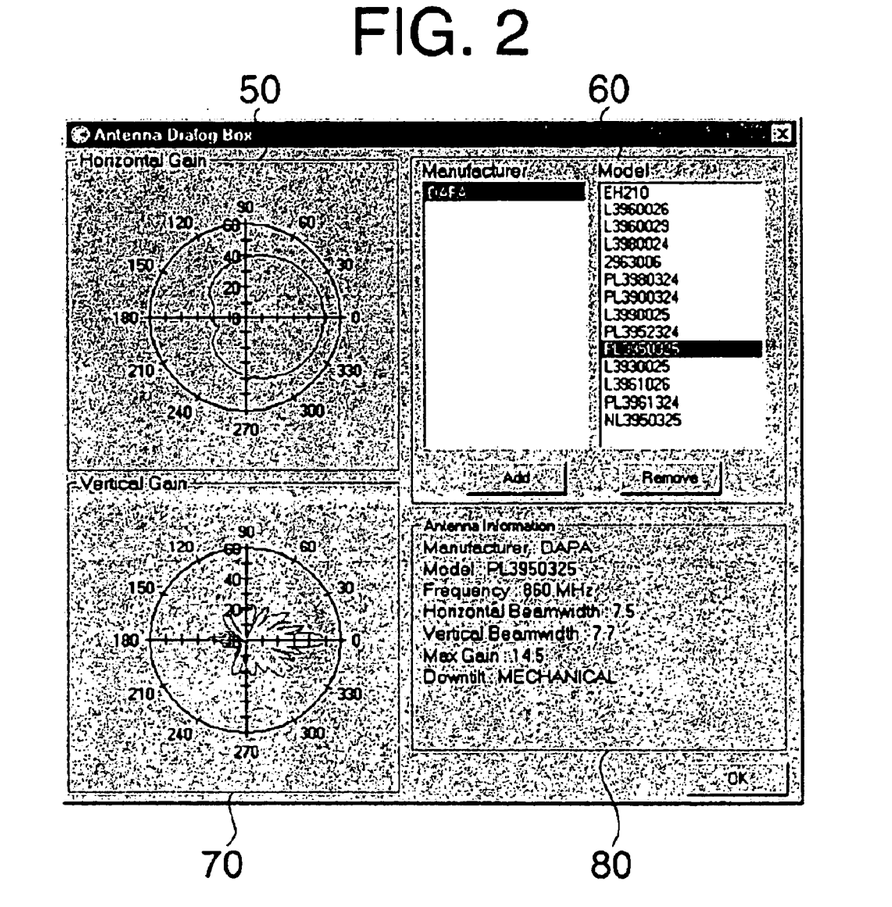
FIG. 2 illustrates an antenna dialog box according to an embodiment of the present invention.

Referring to FIG. 2, an antenna dialog box is illustrated. Via the antenna dialog box, antenna data is made available for a user to select as input data. A particular antenna may be selected according to manufacturer and model number 60. Textual information is displayed 80 for the user's consideration, along with graphical displays of an antenna's horizontal gain 50 and vertical gain 70.

Figure 3:
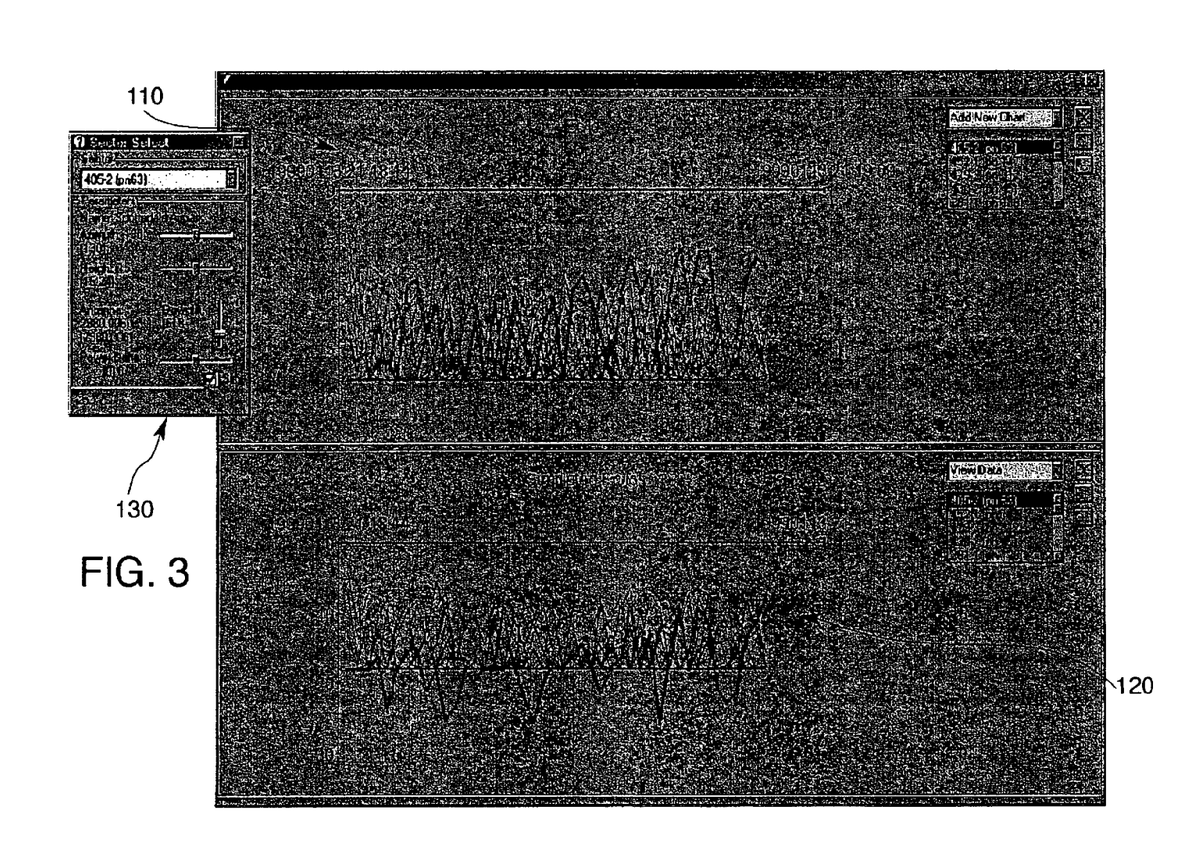
FIG. 3 illustrates a user interface for inputting proposed changes to the network's parameters and displaying simulation results according to an embodiment of the present invention.

Referring to FIG. 3, a user interface for inputting proposed changes to the network's parameters is illustrated. A "before" plot of $E_C/I_0$ versus time 110 is displayed adjacent an "after" plot of $E_C/I_0$ versus time 120. A sector select window for varying parameters of selected sectors 130 is shown along side the signal versus time plots 110, 120. The illustrated example shows that sector number 405-2 has been selected and that one parameter, antenna downtilt, has been changed from 6 degrees to 8 degrees. The signal strength plot for sector 405-2 is highlighted in red in both plots 110, 120. It is clear from inspection of the after plot 120 to the before plot 110 that the proposed antenna downtilt change would have a markedly bad affect on the performance of the sector.

Figure 4:
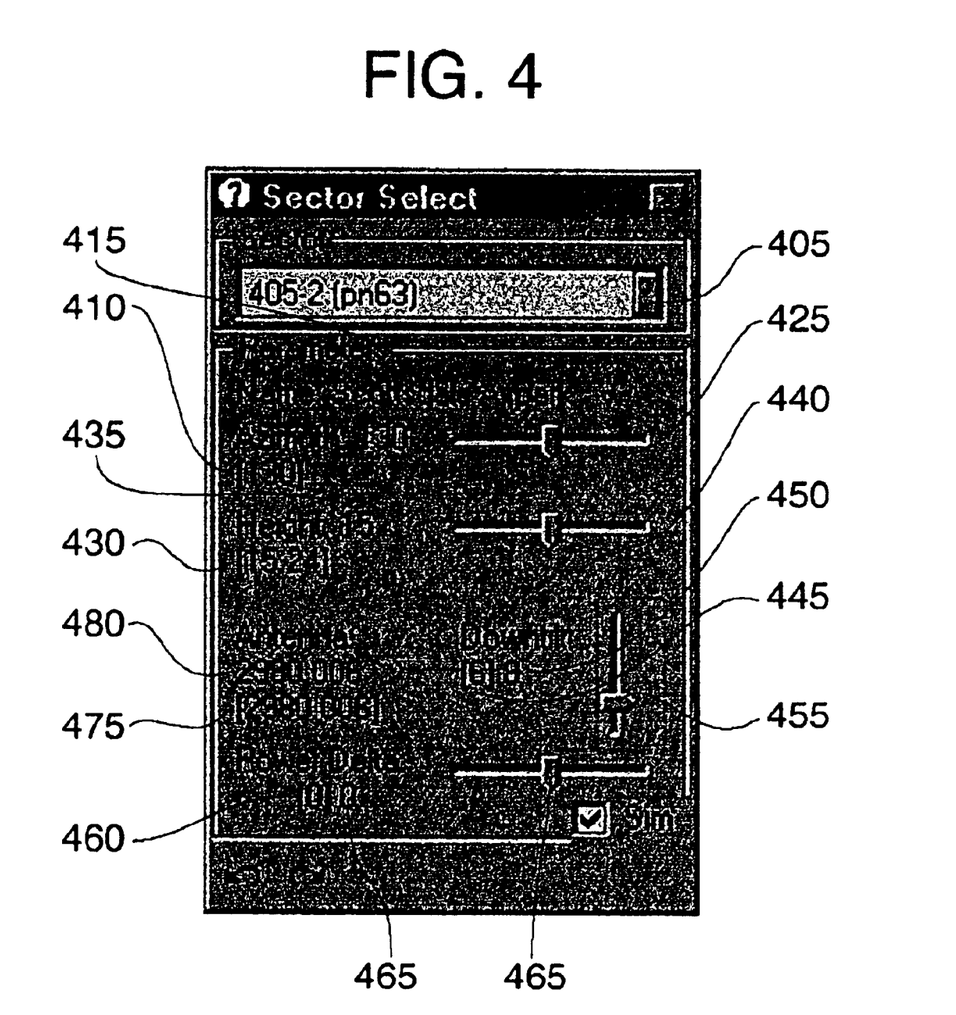
FIG. 4 illustrates a detail view of the sector select window of FIG. 3.

Referring to FIG. 4, a detail of the sector select window 130 is illustrated to provide a detailed view of how various parameters of a selected sector can be varied for simulation. A selection button 405 provides for a user to select any sector in the wireless network for proposed parameter changes.

The antenna azimuth parameter may be changed via the azimuth slide control 425, the actual azimuth value being displayed in brackets 410 and the proposed value 415 being displayed adjacent the azimuth slide control 425. The antenna height parameter may be changed via the height slide control 440, the actual height value (shown in meters) being displayed in brackets 430 and the proposed value 435 being displayed adjacent the height slide control 440. The antenna downtilt parameter may be changed via the downtilt slide control 455, the actual downtilt value being displayed in brackets 445 and the proposed value 450 being displayed adjacent the downtilt slide control 455.

The sector transmission power parameter may be changed via the power delta (i.e., change in power) slide control 465, the original power delta value (zero) is displayed in brackets 460 and the proposed power delta value 470 is displayed adjacent the power delta slide control 465. The user is also free to change the type of antenna being used in the simulation. The actual status quo antenna type is displayed in brackets 475 and the selected antenna type is displayed 480 under the "antenna" label. Selections of antenna types are made via the antenna dialog box shown in FIG. 2.

Simulation is performed by numerical calculations performed by an interference engine. The simulation algorithm receives input information in the following form:

The list of sectors the user wants to change. The simulation needs the old and new power/height/downtilt/azimuth for every sector changed.

The following measurements at each location where the user wants to simulate the change:

$Ec_iRc$—pilot channel power for sector i (units dBm)

$(E_c/I_a)_i$—pilot channel signal-to-noise ratio for sector i (units dB)

$I_0W$—total received power at this location (units dBm)

The input measurements are typically received in units of dB or dBm, which are nonlinear (logarithmic) units. As most of the calculations disclosed are in linear units, a conversion from logarithmic to linear units would be necessary.

Once the input data has been properly initialized, the following process steps are performed:

1) Use pilot channel powers to find X, where X is defined as:

$$X=I_oW/\text{sum}(Ec_iRc)$$

2) For each sector whose power or antenna has changed, calculate the new $Ec_iRc$, which is denoted as $Ec_iRc'$, after antenna changes:

$Ec_iRc'=Ec_iRc$–oldAntennaGain at LOS path from antenna to this location +newAntennaGain at LOS path from antenna to this location –oldpower for this sector +newPower for this sector

[NOTE: This calculation is written for dB units instead of linear units]

3) Calculate the new total received power, $I_0W'$, at this location after antenna changes:

$$I_oW'=X \cdot \text{sum}(Ec_iRc')$$

4) Find the new $E_c/I_o$ value, for a sector i, at this location after antenna changes:

$$(E_c/I_o)_i'=Ec_iRc'/I_oW'$$

5) Perform this for every location that contains measurements from changed sectors.

Once the algorithm has been performed for all changed sectors, the resulting simulation data, $Ec_iRc'$, $(E_c/I_o)_i'$ and $I_0W'$, needs to be converted back into logarithmic units (dB or dBm units). These are the results of the simulation that the user will see. The above formulas are preferred simplifications based on a rigorous mathematical derivation.

Figure 5:
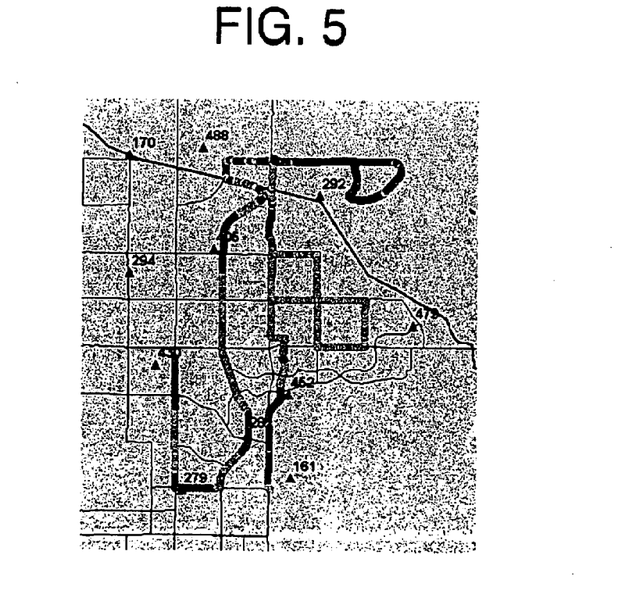
FIG. 5 illustrates a map output display according to an embodiment of the present invention.
Figure 6:
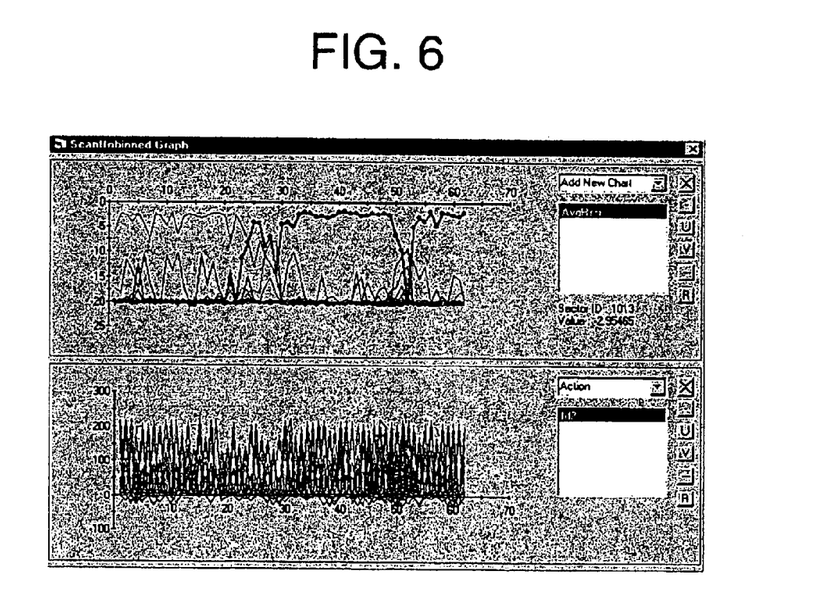
FIG. 6 illustrates a graph output display according to an embodiment of the present invention.

Simulation outputs are provided as signal strength maps, either two dimensional or virtual reality, as tables of numerical data, and as charts. Referring to FIG. 5, an example, according to an embodiment of the present invention, of a two-dimensional map simulation output is illustrated. Referring to FIG. 6, an example, according to an embodiment of the present invention, of a graph output is illustrated.

The present invention also performs automated optimization of parameters affecting hand off, and generates reports of such automated optimization results.

One parameter that is automatically optimized according to the present invention is Window Size in a CDMA system. As a general rule, it is desirable to set the window size parameter to be the smallest size that will give an acceptable rate of capture of the PN sequence of the sector. Since the prior art provides no satisfactory device or process for optimizing choices of window size for the sectors in a network, network engineers have no choice but to program the window size parameter at each sector based on a best guess as to what may be an optimum value.

The present invention provides an algorithm that predicts optimum window size based on empirical measurements. The input parameters to the algorithm are $E_C/I_0$, pilot channel SNR for a given sector, measured delay time τ from the base location to a given measuring location, and the location information itself. Another factor that affects the algorithm is an assumption that is made as to which particular sector in the network provides the reference time for the hypothetical mobile unit to be handed off.

Figure 8:
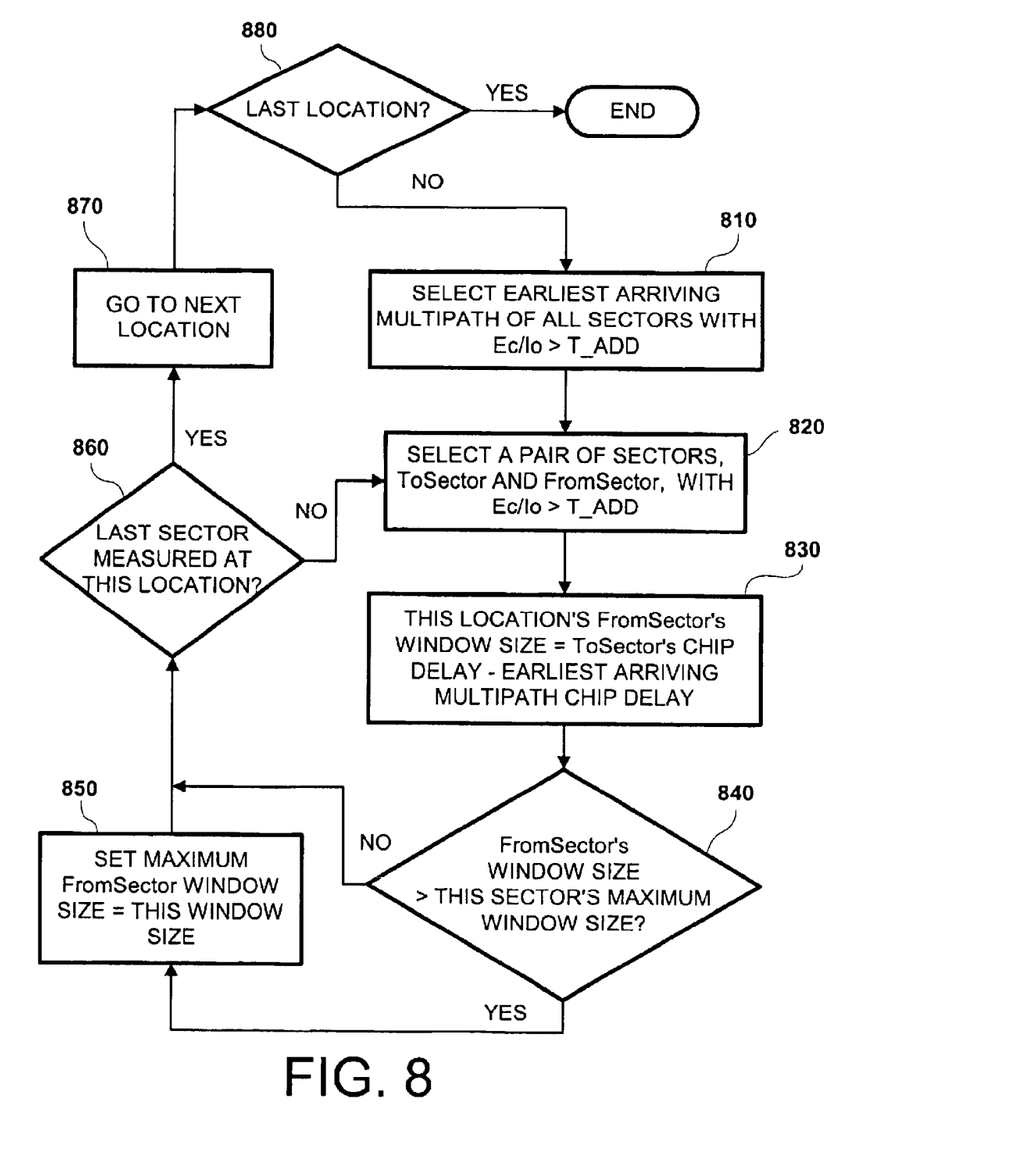
FIG. 8 illustrates a flowchart for an algorithm to ascertain an appropriate window size for a sector of a CDMA wireless network according to another aspect of the present invention.

Referring to FIG. 8, a flowchart for an algorithm to ascertain an appropriate window size for a subject sector of a CDMA wireless network is illustrated. The algorithm is applied to empirical drive test data. Multipath signals of all sectors are evaluated to see if they meet the threshold criteria Ec/Io>T_ADD, and then the earliest arriving is selected 810 therefrom. A pair of sectors, ToSector and FromSector, are selected 820, which meet the threshold criteria Ec/Io>T_

ADD. The window size of the subject sector (i.e., From-Sector's window size) is set 830 to a value that is equal to ToSector's chip delay, less the chip delay of the earliest arriving multipath sector. An evaluation is then made 840 as to whether FromSector's window size is greater than the maximum window size of the subject sector. If it is, then the maximum FromSector window size is set 850 to equal to the window size for the subject sector. If it is not, then no action is taken.

In either case, an evaluation is then made 860 as to whether this is the last sector measured at a given location. If not, then the algorithm loops back to the step of selecting 820 a pair of sectors, ToSector and FromSector. If so, then the algorithm proceeds on to the next measurement location 870 and continues to repeat the algorithm as described above. The algorithm is exhausted 880 when the last measurement location has been exhausted.

A related concept in time division type wireless networks (e.g., GSM, TDMA, iDEN) is the "timing advance" parameter. Timing advance is an analogous concept to the window size parameter of CDMA networks, but is directed to finding an appropriate sector signal transmission timing advance rather than to code synchronization. Calculation of optimum timing advance is performed in an analogous manner as to window size.

Figure 9:
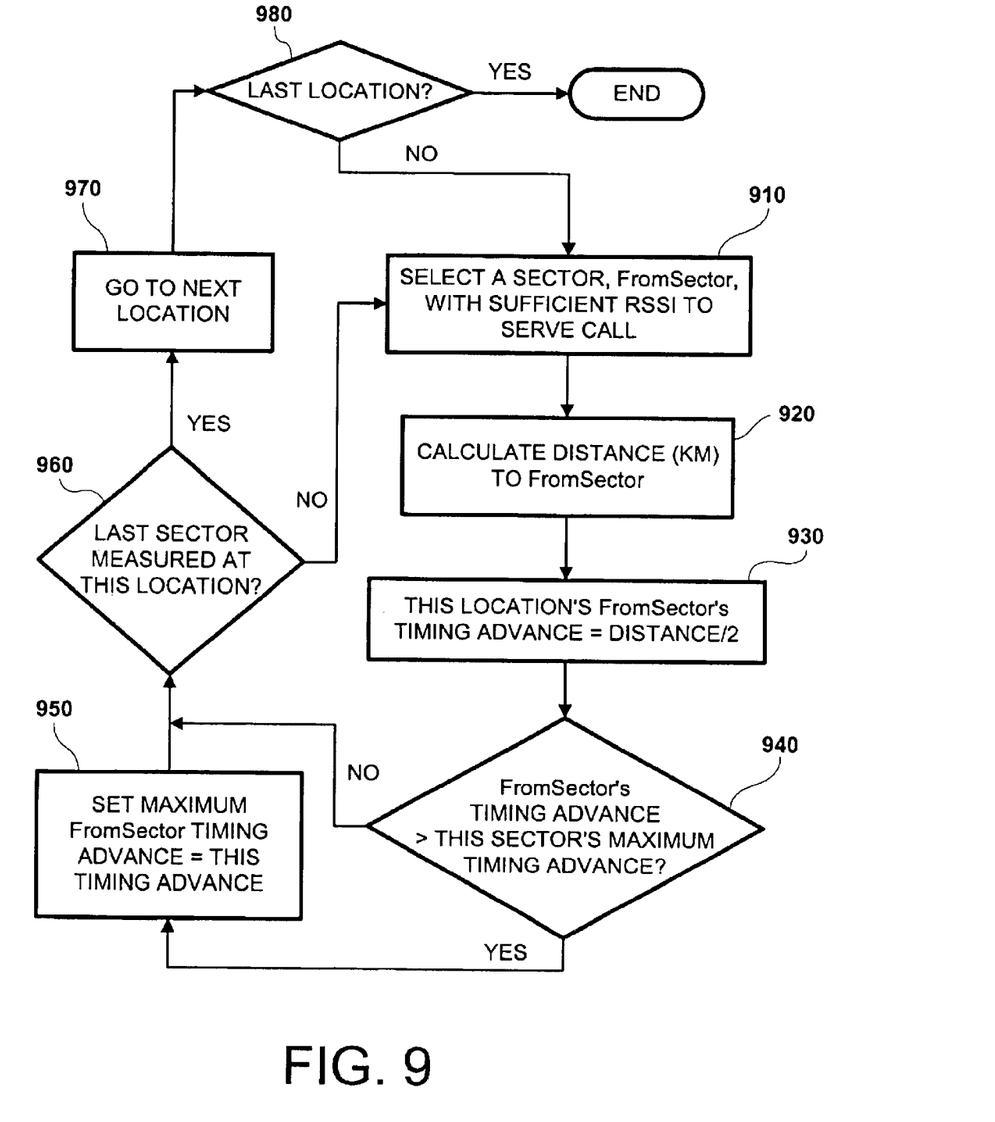
FIG. 9 illustrates a flowchart for an algorithm to ascertain an appropriate timing advance for a sector of a time division-type wireless network according to yet another aspect of the present invention.

Referring to FIG. 9, a flowchart for an algorithm to ascertain an appropriate timing advance for a sector of a time division type wireless network is illustrated. The algorithm is applied to empirical drive test data. A sector, FromSector is selected 910, with a sufficient Received Signal Strength Indication (RSSI) to serve a call. The distance to FromSector is then calculated 920. The timing advance of the subject sector (i.e., FromSector's timing advance) is set 930 to a value that is equal to be half of the calculated distance. An evaluation is then made 940 as to whether FromSector's timing advance is greater than the maximum timing advance of the subject sector. If it is, then the maximum FromSector timing advance is set 950 to equal to the timing advance for the subject sector. If it is not, then no action is taken.

In either case, an evaluation is then made 960 as to whether this is the last sector measured at a given location. If not, then the algorithm loops back to the step of selecting 920 a sector of sufficient RSSI. If so, then the algorithm proceeds on to the next measurement location 970 and continues to repeat the algorithm as described above. The algorithm is exhausted 980 when the last measurement location has been exhausted.

Each sector in a wireless network has a neighbor list. Conventionally, the neighbor list was input by a network engineer making a judgement call as to what looked like the best prioritization of which neighboring sectors were most relevant to the subject sector for purposes of making hand offs of calls. For the wireless network to operate effectively, it is important that the prioritization of members of the neighbor list for each sector be accurate.

The primary factor in determining ranking of neighbor list members is a quantity called "weight." Weight is calculated, with respect to two neighbor sectors "a" and "b", as follows:

$$\text{weight}_{a \to b} = \sum_{i=1}^{n} 10^{\wedge}\{[(E_C/I_0(a,i) - \text{T\_ADD}) + (E_C/I_0(b,i) - \text{T\_ADD})]/10\}$$

In this equation $E_C$ is the energy per chip in the relevant pilot channel (a or b in this example), $I_0$ is the total noise power spectral density, $E_C/I_0$ is the signal-to-noise ratio of each sector at each location, and T_ADD is a predetermined threshold signal level. The value of n represents the number of locations over which summation is to occur.

This weight calculation is calculated for every pair wise combination of sectors between which the T_ADD threshold criteria is met. The input information for this formula is the empirical measurements of $E_C/I_0$.

Figure 7:
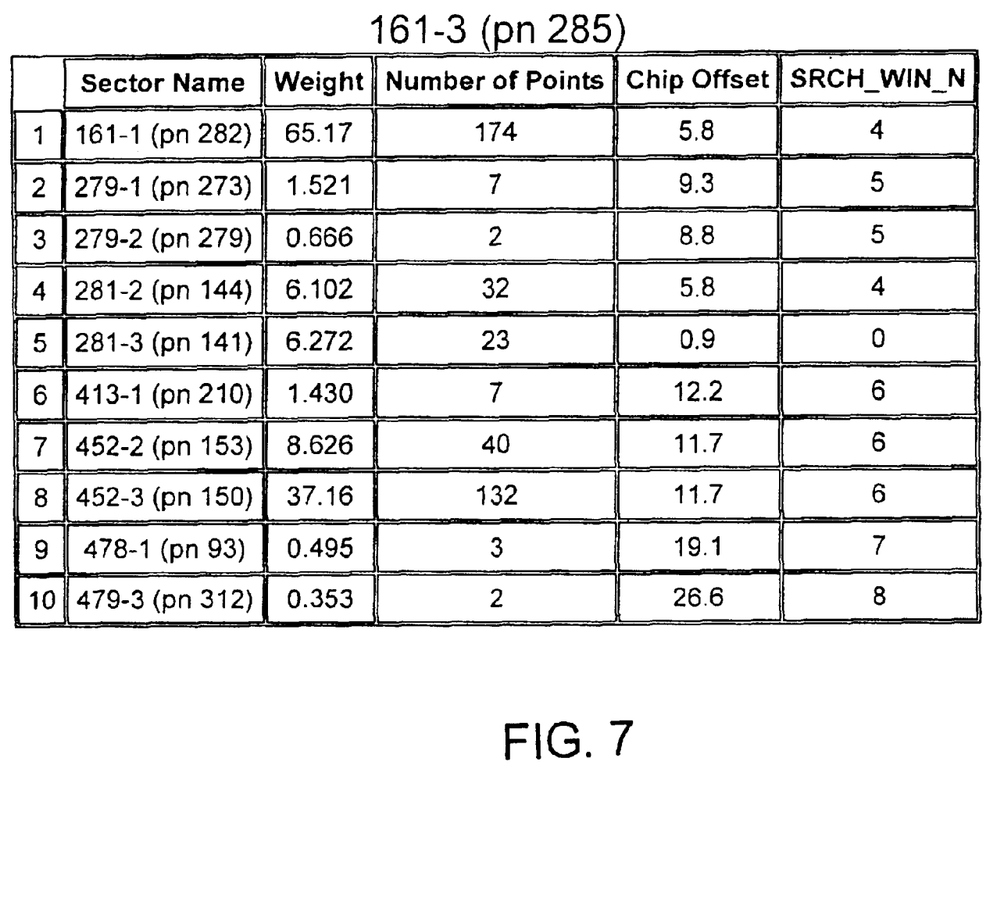
FIG. 7 illustrates an optimized neighbor list generated according to one aspect of the present invention.

Referring to FIG. 7, a table is shown that comprises an output report according to the automatic optimization aspect of the present invention. The Sector Name column lists, in descending rank order, the ten sectors that make up the Neighbor List for sector number 161-3. The SRCH_WIN_N column lists the optimized search window sizes for the sectors on the Neighbor List.

Additionally, the present invention generates a Neighbor Discrepancy List, which is a comparison of the Neighbor List before optimization and the Neighbor List after optimization.

Although the present invention has been described in terms of preferred embodiments, various modifications and variations may be made without departing from the scope of the invention, as will be understood by those of skill in the art. The present invention is limited only by the appended claims.

What is claimed is:

1. A process of selecting a value of window size for a sector-of-interest in a code division multiple access wireless network, the process comprising:
   select the earliest arriving multipath signal of all sectors that meet the threshold criteria $E_c/I_o >$ T_ADD, wherein T_ADD is a predetermined threshold signal level;
   select a pair of sectors, ToSector and FromSector, that meet the threshold criteria $E_c/I_o >$ T_ADD;
   set a window size of FromSector=chip delay of ToSector−chip delay of the earliest arriving multipath sector;
   evaluate whether the window size of FromSector>maximum FromSector window size; and
   in the event that the window size of FromSector is greater than the maximum window size, then set maximum FromSector window size=the window size of FromSector.

2. A computer program product for enabling a computer to select a value of window size for a sector-of-interest in a code division multiple access wireless network, the computer program product comprising:
   software instructions for enabling the computer to perform predetermined operations, and
   a computer readable medium embodying the software instructions;
   the predetermined operations comprising:
      select the earliest arriving multipath signal of all sectors that meet the threshold criteria $E_c/I_o >$ T_ADD, wherein T_ADD is a predetermined threshold signal level;
      select a pair of sectors, ToSector and FromSector, that meet the threshold criteria $E_c/I_o >$ T_ADD;
      set a window size of FromSector=chip delay of ToSector−chip delay of the earliest arriving multipath sector;
      evaluate whether the window size of FromSector>maximum FromSector window size; and
      in the event that the window size of FromSector is greater than the maximum window size, then set maximum FromSector window size=the window size of FromSector.

3. A computer system adapted to select a value of window size for a sector-of-interest in a code division multiple access wireless network, comprising:

a processor, and a memory including software instructions adapted to enable the computer system to perform operations comprising:

select the earliest arriving multipath signal of all sectors that meet the threshold criteria $E_c/I_o>T\_ADD$, wherein $T\_ADD$ is a predetermined threshold signal level;

select a pair of sectors, ToSector and FromSector, that meet the threshold criteria $E_c/I_o>T\_ADD$;

set a window size of FromSector=chip delay of ToSector−chip delay of the earliest arriving multipath sector;

evaluate whether the window size of FromSector>maximum FromSector window size; and in the event that the window size of FromSector is greater than the maximum window size, then set maximum FromSector window size=the window size of FromSector.

* * * * *